Nov. 10, 1959     J. HABERSTROH     2,911,733
ENSILAGE SPREADER WITH BULLDOZER ATTACHMENT
Filed March 23, 1956
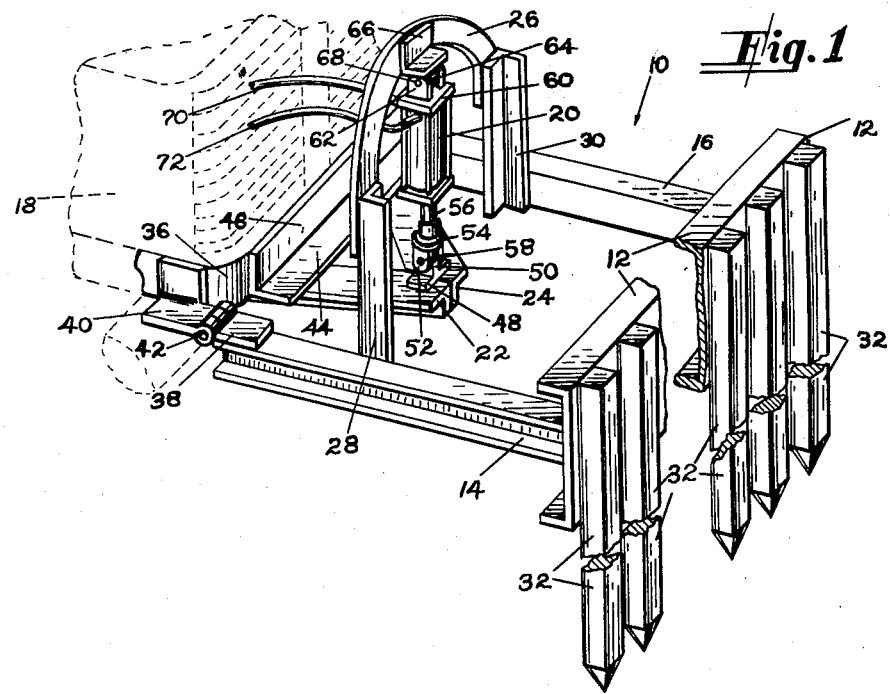
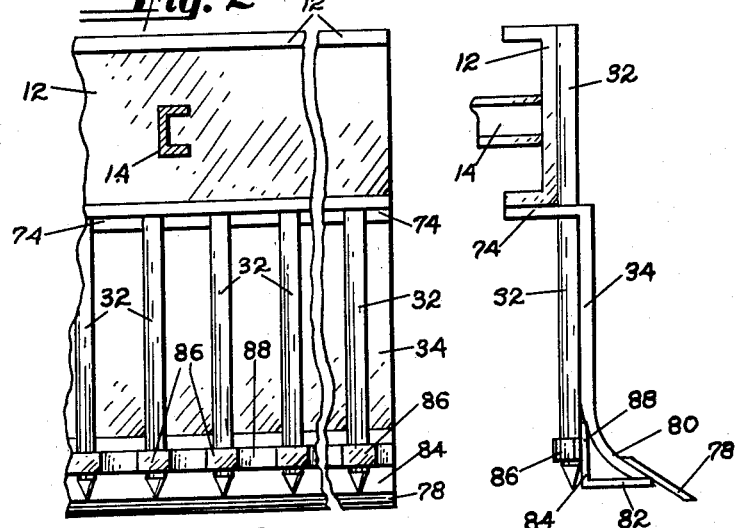
INVENTOR.
JOHN HABERSTROH
BY Arthur H. Sturges
Attorney
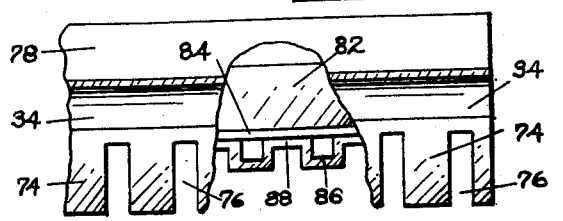

United States Patent Office 2,911,733
Patented Nov. 10, 1959

2,911,733
ENSILAGE SPREADER WITH BULLDOZER ATTACHMENT

John Haberstroh, Rocklake, N. Dak.

Application March 23, 1956, Serial No. 573,471

1 Claim. (Cl. 37—144)

This invention relates to farm machinery and equipment particularly of the type used in combination with winter feed for cattle and other stock, and in particular a support bar having teeth depending therefrom carried by extended ends of beams hinged on the forward end of a tractor and adapted to be adjusted vertically by a hydraulic jack mounted on the tractor and positioned with the upper end connected to a yoke extended upwardly from the beams.

The purpose of this invention is to provide means for mounting a plurality of teeth and a scraper blade on the forward end of a tractor to provide means for raking and working ensilage in preparing the ensilage for storage in a pit or the like.

Ensilage used for live stock feed during the winter months is stored in both silos and pits positioned in the ground, and where it is stored in a pit it is desirable that the ingredients thereof be thoroughly mixed. Because of the consistency of the ensilage mixing the products thereof by hand is difficult, and to obtain good ensilage thorough mixing is necessary. It is also desirable that the ensilage be well packed.

With these thoughts in mind this invention contemplates a mounting beam carried on extended ends of spaced arms hinged to a tractor frame and adapted to be adjusted vertically with a hydraulic jack and a plurality of teeth or prongs depending from the mounting beam providing a rake or fork, and adapted to be covered with a scraper blade to provide a bulldozer for working and moving the ensilage.

The object of this invention is, therefore, to provide a power rake or fork particularly adapted for mixing ensilage.

Another object of the invention is to provide an ensilage mixing fork that is adapted to be mounted on the frame of a tractor.

Another important object of the invention is to provide an ensilage mixing fork for use on a tractor in which means is provided for adjusting the elevation thereof.

It is yet another object of the invention to provide an ensilage mixing fork that may readily be converted into a bulldozer.

A further object of the invention is to provide an ensilage fork for use on the forward end of a tractor in which the position of the device is adapted to be controlled from a seat of the tractor.

A still further object of the invention is to provide an ensilage fork and bulldozer attachment for use on a tractor, loader, or the like in which the device is of a simple and economical construction.

With these and other objects and advantages in view the invention embodies a transversely disposed channel-shaped mounting beam, spaced arms extended from the beam and having hinges on extended ends thereof, said hinges being adapted to be attached to a tractor frame, a platform also adapted to be attached to a tractor frame and positioned between the arms, an upwardly extended yoke carried by the arms, a hydraulic jack mounted on the platform and positioned with the upper end connected to the yoke, spaced prongs carried by the mounting beam and depending therefrom, and a scraper blade positioned over the prongs and adapted to be connected to the mounting beam.

Other features and advantages of the invention will appear from the following description taken in connection with the drawings wherein:

Figure 1 is a perspective view, with parts broken away, illustrating the assembly of the ensilage fork and showing the device mounted on the front of a tractor frame, the portion of the tractor being shown in dotted lines.

Figure 2 is a cross section through the ensilage fork attachment looking toward the rear surface of the mounting beam with parts broken away, and showing the device with a scraper blade positioned against the forward surfaces of the prongs depending from the mounting beam.

Figure 3 is a side elevational view of the device with the parts as shown in Figure 2, and also with parts broken away.

Figure 4 is a plan view of the scraper or bulldozer blade of the attachment with parts broken away, and showing, in particular sockets for receiving the prongs depending from the mounting beam of the device.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a mounting beam or element, numerals 14 and 16 spaced arms extending from the mounting beam to a tractor 18, numeral 20 a hydraulic cylinder or jack mounted on a platform formed with L-shaped members 22 and 24, and connected to a yoke including an arcuate bar 26 supported by posts 28 and 30, numeral 32 spaced teeth or prongs carried by and depending from the mounting beam 12, and numeral 34 a scraper blade also adapted to be secured to the mounting beam and positioned to cover said prongs.

The arms or frame elements 14 and 16 are secured to a bar 36 of the tractor frame with hinges having plates 38 secured to ends of the arms and L-shaped plates 40 secured to the bar 36, and the hinge plates are provided with meshing hub members through which pins 42 extend as shown in Figure 1. The members 22 and 24 of the platform are secured to a horizontally disposed leg 44 of an angle bar 46 on the end of the tractor frame, and the platform is provided with a T-shaped clip 48 having an upwardly extended tongue 50 to which ears 52 of a connector 54 on the lower end of a piston rod 56 are pivotally connected by a pin 58.

The connecting rod 56 extends from a piston in the cylinder 20, and the upper end 60 of the cylinder is provided with ears 62 that are connected to a tongue 64 of an angle clip 66 with a pin 68. The clip 66 is mounted on the arcuate bar 26 of the yoke, and with fluid under pressure supplied to opposite ends of the cylinder through tubes 70 and 72 which extend from a pump or fluid storage tank on the tractor, the elevation of the mounting beam and prongs 32 is controlled by an operator on the seat of the tractor.

The prongs, teeth, or tines 32 which provide ensilage working elements, are secured to the mounting beam 12, by welding or the like, and it will be understood that the arms, hinges, platform, yoke, and other parts are also secured together by similar means.

The scaper or bulldozer blade 34 is formed as illustrated in Figures 2, 3, and 4 with a flange 74 having slots 76 therein on the upper end and with a hardened steel blade 78 on an arcuate section 80 at the lower end. The arcuate section is reinforced with an angle bar having a horizontal leg 82 and a vertical leg 84, and the vertical leg is provided with sockets 86 that are positioned to receive the prongs 32 with the flange 74 secured by bolts, or other suitable means to the lower flange of the mounting beam 12 which is channel-shaped in cross section. The slots 76 are also positioned to receive the prongs 32 with the scraper blade installed on the attachment. By this means the device is also adapted to be used as a bulldozer for moving soil, or for pushing and scooping snow and the like.

The sockets 86 on the rear of the vertical leg 84 of the angle bar on the arcuate section of the blade are formed with a strap or bar 88 that is welded to the leg 84 thereby reinforcing the lower portion of the scraper blade and adding rigidity to the attachment.

*Operation*

The bar 36 extends around the end of the tractor frame and is secured to the frame by bolts or other suitable fastening means and the platform or support and hinges are also secured by bolts, welding, or other fastening means to the bar whereby the attachment may be mounted on a tractor by the average mechanic.

With the parts in position the prongs provide a fork by which ensilage may be worked back and forth and thereby thoroughly mixed, and when the ensilage is in condition the blade 34 is attached over the prongs whereby the ensilage may be pushed into a pit or the like. The blade may be attached and removed as desired.

The mounting elements, such as the platform and hinges may be provided in different shapes and designs to correspond with the tractors upon which the attachment may be used.

From the foregoing specification, it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

In an ensilage spreader and bulldozer attachment, the combination which comprises a mounting beam, a tractor frame, spaced arms extended from the mounting beam to the tractor frame, hinges pivotally connecting the arms to the tractor frame, a yoke extended upwardly from said arms, a platform extended from said tractor frame and positioned below the yoke, a hydraulic cylinder positioned on the platform and operatively connected to the yoke, spaced teeth secured to and depending from said mounting beam, and a scraper blade secured to the mounting beam and positioned over the teeth, said blade having a flange on the upper end with slots therein through which the teeth extend and also having sockets on the lower portion through which the teeth extend and said blade having a removable scraper blade on the lower edge and a reinforcing angle bar on the rear surface and on which said sockets are positioned.

References Cited in the file of this patent

UNITED STATES PATENTS

| | | |
|---|---|---|
| 1,473,003 | Berry | Nov. 6, 1923 |
| 2,029,122 | Stout | Jan. 28, 1936 |
| 2,081,192 | Allin et al. | May 25, 1937 |
| 2,295,458 | Edwards | Sept. 8, 1942 |
| 2,404,759 | Washbond | July 23, 1946 |
| 2,494,225 | Blake | Jan. 10, 1950 |